UNITED STATES PATENT OFFICE.

ALBERT H. HENDERSON, OF BALTIMORE, MARYLAND, ASSIGNOR TO THE HENDERSON RUBBER COMPANY, OF BALTIMORE, MARYLAND, A CORPORATION OF MARYLAND.

METHOD OF TREATING RAWHIDE AND THE PRODUCT RESULTING THEREFROM.

1,094,853. Specification of Letters Patent. Patented Apr. 28, 1914.

No Drawing. Application filed August 3, 1911. Serial No. 642,205.

*To all whom it may concern:*

Be it known that I, ALBERT H. HENDERSON, a citizen of the United States, residing at Baltimore, State of Maryland, have invented new and useful Improvements in Methods of Treating Rawhide and the Product Resulting Therefrom, of which the following is a specification.

My invention relates to a method of treating rawhide, or equivalent natural products of the animal kingdom, in the normal or in any conveniently divided form, as in that of disks or slugs, or in granulated condition, in such manner as to expand the rawhide or other natural animal product, whereby it is made pliable and soft, and whereby also it is made to constitute a good rubber substitute which, however, may or may not be combined with rubber.

My invention also relates to the product of such a method or process.

Considering my invention as a method, I first treat or expand the rawhide or the like in a watery solution containing a substance or substances such as a salt which will produce osmotic pressure upon the cells of the hide, together with one of the deliquescent polyatomic alcohols such as glycerin. A mixture of such alcohols may be used if desired. Whether one or a mixture of such is employed it is introduced and absorbed into the interior of the rawhide. Without confining myself to specific proportions, times and the like, I would say that in order to make one gallon of the watery solution, take, say four ounces of salt, two and one half quarts of water and one and one half quarts of high grade glycerin. In this immerse two pounds of the rawhide which may remain therein from two to twelve days or until the maximum expansion thereof is obtained. Practically four pounds of completed matter are produced from two pounds of hide. Secondly, I apply to the rawhide treated as aforesaid a heat of say 180° to 212° F. in the presence of an oily vehicle, such as turkey red oil, or coal tar creosote, with, by preference, the addition of a fixed oil which may be castor oil, cotton seed oil, or the like. This is done for the purpose of removing the moisture and the excess of the polyatomic alcohol or alcohols employed. This application of heat in the presence of such an oily vehicle as that mentioned may be continued for one to three hours, provided the time is not enough to effect gelatinization, which is to be avoided.

By the expanding treatment of the rawhide and the absorption into its interior of such ingredients as are above mentioned, the substance is physically made permanently elastic, pliable, soft and resilient.

The invention described in my application Serial No. 716,861, filed Aug. 24, 1912, for method of treating by-products of the animal kingdom, is to be distinguished from the invention forming the subject matter herein described and claimed in that in said application no reference is made to the addition of a fixed oil to the oily vehicle mentioned for the purpose of removing the moisture and the excess of said oily vehicle. In my present invention such a fixed oil is used for that purpose, it having been found advisable.

The composition of matter produced as herein described may or may not be combined with rubber or rubber substitutes, and whether or not combined with rubber, is more especially designed to be compressed or unified in masses or sheets in which form it is well adapted as a body, filler, lining or element in wheel tires for automobiles or other vehicles, and for other uses in the industrial arts. If rubber or rubber substitutes are combined with the treated rawhide they may be added thereto in any suitable form and be subjected to vulcanization at some stage of the method.

I claim:—

1. The method herein described of expanding rawhide, or the like, in a watery solution containing a substance which will produce osmotic pressure upon the cells of the hide together with a deliquescent polyatomic alcohol, and thereafter subjecting the rawhide treated as aforesaid, to heat in the presence of an oily vehicle, substantially as set forth.

2. The method herein described of expanding rawhide, or the like, in a watery solution containing a substance which will produce osmotic pressure upon the cells of the hide together with a polyatomic alcohol capable of deliquescence, and thereafter subjecting the rawhide treated as aforesaid, to heat in the presence of an oily vehicle and a fixed oil, substantially as set forth.

3. The method herein described of expanding rawhide, or the like, in a watery solution containing a substance which will produce osmotic pressure upon the cells of the hide together with a polyatomic alcohol capable of deliquescence, thereafter subjecting the rawhide treated as aforesaid, to heat in the presence of an oily vehicle and a fixed oil, introducing rubber to the interior of the rawhide, and vulcanizing the rubber, substantially as set forth.

4. An article of manufacture consisting of a consolidated mass of expanded granules or fragments of rawhide or the like charged with a deliquescent polyatomic alcohol, substantially as set forth.

5. An article of manufacture consisting of a consolidated mass of granules or fragments of rawhide or the like charged with a deliquescent polyatomic alcohol and vulcanized rubber, substantially as set forth.

6. The herein described composition of matter or rubber substitute consisting of rawhide rendered pliable and soft to a point short of gelatinization, substantially as set forth.

7. The herein described composition of matter consisting of rawhide rendered pliable and soft to a point short of gelatinization, and combined with rubber, substantially as set forth.

In testimony whereof I affix my signature in presence of two witnesses.

ALBERT H. HENDERSON.

Witnesses:
   JAMES F. JOHNSON,
   C. HOWARD MILLIKEN.

---

Copies of this patent may be obtained for five cents each, by addressing the "Commissioner of Patents, Washington, D. C."